United States Patent
Poe et al.

(10) Patent No.: US 12,418,461 B2
(45) Date of Patent: Sep. 16, 2025

(54) DEVICE AND METHOD FOR MANAGING A SERVICE RELATED TO MULTIPLE NETWORK SLICES

(71) Applicant: HUAWEI TECHNOLOGIES CO., LTD., Guangdong (CN)

(72) Inventors: Wint Yi Poe, Munich (DE); Clarissa Marquezan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 625 days.

(21) Appl. No.: 17/221,435

(22) Filed: Apr. 2, 2021

(65) Prior Publication Data

US 2021/0250814 A1 Aug. 12, 2021

Related U.S. Application Data

(63) Continuation of application No. PCT/EP2018/077197, filed on Oct. 5, 2018.

(51) Int. Cl.
*H04L 41/5025* (2022.01)
*H04L 41/12* (2022.01)
(Continued)

(52) U.S. Cl.
CPC .......... *H04L 41/5025* (2013.01); *H04L 41/12* (2013.01); *H04W 28/0236* (2013.01);
(Continued)

(58) Field of Classification Search
CPC . H04L 41/40; H04L 41/5003; H04L 41/5009; H04L 41/0894; H04L 41/0895;
(Continued)

(56) References Cited

U.S. PATENT DOCUMENTS 10,637,725 B2* 4/2020 Li ........................ H04L 41/0803
2012/0233302 A1* 9/2012 Kallin ..................... H04L 47/72
709/221
(Continued)

FOREIGN PATENT DOCUMENTS

CN 106549806 A 3/2017
CN 106657194 A 5/2017
(Continued)

OTHER PUBLICATIONS

Ming, "Network Slicing Research in 5G: Status and Challenges," Journal of Network New Media, vol. 7, No. 1, Jan. 2018, 7 pages (with English abstract).
(Continued)

*Primary Examiner* — Guang W Li
(74) *Attorney, Agent, or Firm* — Fish & Richardson P.C.

(57) ABSTRACT

The present disclosure relates to systems, devices, and methods for communication services. One method comprises: obtaining first management data for a service from at least one of a plurality of network slices, wherein the first management data comprises one or more of performance management (PM) data for the service, fault management (FM) data for the service, or analytics data of the service; evaluating at least one assurance indicator of the service based on the first management data to generate an evaluation result; and generating second management data based on the evaluation result, wherein the second management data comprises at least one of configuration management (CM) data for modification of the service or at least one of the plurality of network slices.

19 Claims, 9 Drawing Sheets

(51) Int. Cl.
  *H04W 28/02* (2009.01)
  *H04W 28/08* (2023.01)
  *H04W 28/24* (2009.01)
  *H04L 41/40* (2022.01)
(52) U.S. Cl.
  CPC ....... *H04W 28/0967* (2020.05); *H04W 28/24* (2013.01); *H04L 41/40* (2022.05)
(58) Field of Classification Search
  CPC ... H04L 41/342; H04L 41/5019; H04L 41/12; H04L 41/5067; H04L 47/24; H04L 47/2425; H04L 47/78; H04L 41/122; H04L 41/042; H04L 41/0823; H04L 41/5025; H04L 41/044; H04L 41/5096; H04W 28/24; H04W 28/16; H04W 24/04; H04W 28/0268; H04W 24/08; H04W 24/10; H04W 28/0967; H04W 28/0284
  See application file for complete search history.

(56) References Cited

U.S. PATENT DOCUMENTS

| | | | |
|---|---|---|---|
| 2016/0353465 A1 | 12/2016 | Vrzic et al. | |
| 2017/0078153 A1 | 3/2017 | Zhang et al. | |
| 2018/0287891 A1* | 10/2018 | Shaw | H04W 24/02 |
| 2019/0261330 A1* | 8/2019 | Hwang | H04L 5/0053 |
| 2019/0327149 A1* | 10/2019 | Sun | H04L 41/0895 |
| 2021/0021494 A1* | 1/2021 | Yao | H04L 41/0631 |
| 2021/0160147 A1* | 5/2021 | Chou | H04L 41/147 |
| 2021/0176142 A1* | 6/2021 | Clarke | H04L 41/5048 |

FOREIGN PATENT DOCUMENTS

| | | | | |
|---|---|---|---|---|
| CN | 106954267 A | | 7/2017 | |
| CN | 108028803 A | | 5/2018 | |
| CN | 108141727 A | | 6/2018 | |
| CN | 108270823 A | | 7/2018 | |
| CN | 108400945 A | | 8/2018 | |
| CN | 109219020 A | * | 1/2019 | ............ H04W 24/02 |
| WO | WO-2017162011 A1 | * | 9/2017 | ............ H04L 41/00 |
| WO | WO-2018089634 A1 | * | 5/2018 | |
| WO | 2018228674 A1 | | 12/2018 | |
| WO | 2019158220 A1 | | 8/2019 | |
| WO | 2019214830 A1 | | 11/2019 | |

OTHER PUBLICATIONS

Office Action issued in Chinese Application No. 201880098432.7 on Sep. 15, 2021, 12 pages.

Xin et al., "A Network Slice Management Scheme Based on Network Functions Virtualisation," Science Technology and Engineering, vol. 17, No. 29, Oct. 2017, 7 pages (with English abstract).

3GPP TR 23.791 V1.0.0 (Sep. 2018), "3rd Generation Partnership Project; Technical Specification Group Services and System Aspects; Study of Enablers for Network Automation for 5G(Release 16)," Sep. 2018, 66 pages.

3GPP TR 28.800 V15.0.0 (Jan. 2018), "3rd Generation Partnership Project; Technical Specification Group Services and System Aspects; Telecommunication management; Study on management and orchestration architecture of next generation networks and services(Release 15)," Jan. 2018, 23 pages.

3GPP TR 28.801 V15.1.0 (Jan. 2018), "3rd Generation Partnership Project; Technical Specification Group Services and System Aspects; Telecommunication management; Study on management and orchestration of network slicing for next generation network (Release 15)," Jan. 2018, 75 pages.

3GPP TS 23.501 V15.3.0 (Sep. 2018), "3rd Generation Partnership Project; Technical Specification Group Services and System Aspects; System Architecture for the 5G System; Stage 2(Release 15)," Sep. 2018, 226 pages.

3GPP TS 28.530 V15.0.0 (Sep. 2018), "3rd Generation Partnership Project; Technical Specification Group Services and System Aspects; Telecommunication management; Management and orchestration; Concepts, use cases and requirements (Release 15)," Sep. 2018, 31 pages.

3GPP TS 28.531 V15.0.0 (Jan. 2018), "3rd Generation Partnership Project; Technical Specification Group Services and System Aspects; Management and orchestration; Provisioning;(Release 15)," Sep. 2018, 61 pages.

3GPP TS 28.532 V15.0.1 (Sep, 2018), "3rd Generation Partnership Project; Technical Specification Group Services and System Aspects; Management and orchestration; Generic management services; (Release 15)," Sep. 2018, 139 pages.

3GPP TS 28.533 V15.0.0 (Sep. 2018), "3rd Generation Partnership Project; Technical Specification Group Services and System Aspects; Management and orchestration; Architecture framework(Release 15)," Sep. 2018, 23 pages.

3GPP TS 28.550 V2.0.0 (Sep. 2018), "3rd Generation Partnership Project; Technical Specification Group Services and System Aspects; Management and orchestration; Performance assurance(Release 15)," Sep. 2018, 58 pages.

3GPP TS 28.552 V15.0.0 (Sep. 2018), "3rd Generation Partnership Project; Technical Specification Group Services and System Aspects; Management and orchestration; 5G performance measurements(Release 15)," Sep. 2018, 39 pages.

Cisco Systems, Inc., "pCR to TR 28.801 Correction to SON concepts clause," 3GPP TSG SA WG5 (Telecom Management) Meeting #113, S5-173386, West Palm Beach, Florida, USA, May 8-12, 2017, 2 pages.

PCT International Search Report and Written Opinion issued in International Application No. PCT/EP2018/077197 on Apr. 17, 2019, 15 pages.

* cited by examiner

DEVICE AND METHOD FOR MANAGING A SERVICE RELATED TO MULTIPLE NETWORK SLICES

CROSS-REFERENCE TO RELATED APPLICATIONS

This application is a continuation of International Application No. PCT/EP2018/077197, filed on Oct. 5, 2018, the disclosure of which is hereby incorporated by reference in its entirety.

TECHNICAL FIELD

The present invention relates to multi-slice, multi-service-instance communication services, particularly to multi-slice, multi-service-instance assurance for Service Level Agreement (SLA) and Quality of Service (QoS) requirement fulfilment of a service. The invention presents to this end a device for managing a service related to at least two network slices and presents a corresponding service managing method.

BACKGROUND

SA5 definitions focus on management of network slices. The concept of end-to-end (E2E) multi-slice communication services or multi-service-instance communication services is not yet supported in the current specifications, such as TS 28.530 and TR 28.800. A multi-slice communication service is a communication service composed of two or more network slices or network slice types. Example network slice types are URLLC, mMTC, eMBB defined by 3GPP. A multi-service-instance communication service is a communication service composed of two or more communication service instances where each communication service instance may or may not be multi-slice service. Examples of multi-slice and multi-service communication services are illustrated in FIG. 9.

Specifically in FIG. 9, the examples of the multi-slice communication services are the communication services A and B. The first service A is composed of three types of network slices identified by their S-NSSAIs IDs (as defined in 3GPP TS 23.501): S-NSSAI A, S-NSSAI B, and S-NSSAI C. The second service B is composed of two network slice types: S-NSSAI A and D. At time of deployment, operators can associate more than one network slice instance (NSI) ID to the same S-NSSAI. For instance, S-NSSAI A is associated with NSI A1, NSI A2, and NSI A3. Different communication services can be composed of the same type of network slice, i.e., S-NSSAI, as in the example of FIG. 9, where the communication service B is also composed of S-NSSAI A. Furthermore, at time of deployment, operators can also define that the same NSI, e.g., NSI A1, can be shared by different communication service instances, e.g. by A and B, as illustrated in FIG. 9. This means, that once the communication services A and B are deployed in the operators network, the NSI A1 will be shared by users from both communication services.

Finally, the specification in SA5 TS 28.530 allows for a communication service to be further composed of different instances of communication services, as the example of communication service C in the bottom part of FIG. 9 shows. In this case, communication service C, is composed of communication service A and communication service B.

Each network slice, as well as each communication service (single or multi-service-instance communication services), will have its specific QoS and Quality of Experience (QoE) requirements. For instance, it may be assumed that S-NSSAI A, S-NSSAI B, and S-NSSAI C represent, respectively, ultra-Reliable Low Latency (uRLLC), enhanced Mobile Broadband (eMBB), and massive Internet of Things (mIoT) network slice types. These different types of network slices have different QoS, such as latency, throughput, reliability, and expected levels of user experience satisfaction. The same applies for the communication services. In this case, in general, a SLA describes the service level objectives by achieving the QoS and QoE expected for the service.

In the case of multi-slice, as well as in the case of multi-service-instance communication services, the QoS and QoE requirements for each, respectively, network slice (S-NSSAIs and its associated NSIs), and communication service instance might be different. In particular, if the same S-NSSAI and its NSIs are shared across multiple communication instances (e.g., S-NSSAI A with NSI-A1 from the communication service A and B in FIG. 9), the corresponding management data, as well as the SLA objectives of QoS and QoE fulfilment, of the shared NSI for each communication service is needed to be fetched correctly. Current SA5 definitions are limited to the management at the NSI level, but assuring that QoS of each NSI is fulfilled, does not guarantee that QoE is guaranteed. Further, the management data (e.g., Performance Management (PM) or Fault Management (FM)) is also not accurate enough in the case of shared NSIs among different communication services, as illustrated in FIG. 9.

Therefore, service assurance in case of multi-slice, multi-service-instance communication services needs to be performed, taking into account the different requirements of those services.

Accordingly, the following problems are yet unresolved:
How complex services composed of multiple service instances and/or multiple NSIs, where the constituents are shared by others, can be managed for E2E service assurance for SLA and QoS requirements fulfilment.
How assurance for 5G and/or beyond 5G services composed of multiple slices and/or multiple service instances can be managed using enhanced management data (PM/FM/Configuration Management (CM)) and/or or network data analytics information defined in 3GPP SA5/SA2.
Which kind of new interfaces and parameters can be provided to allow E2E service assurance to support 5G and/or beyond 5G complex services.

In 3GPP TS 28.530 v1.0.0 and TR 28.800 v15.0.0, the current 3GPP management functions (e.g., Communication Service Management Function (CSMF), Network Slice Management Function (NSMF), and Network Slice Subnet Management Function (NSSMF) do not support functionalities for E2E multi-slice, multi-service-instance management. However, it has been agreed that a communication service can be composed of multiple slices in the clause 4.1.3 in TS 28.530. In the clause 7.3.3.3.2 in the TR 28.800, it has been agreed that a communication service can be composed of multiple communication service instances, which can be deployed across multiple communication service providers.

In 3GPP TR 23.791, in the clause 4.2 in the architectural assumptions defined in SA2 FS_eNA, it has been agreed that Operation, Administration and Maintenance (OAM) or Management Plane (MP) is a potential consumer of analytics generated by a Network Data Analytics Function (NWDAF). However, the interactions between NWDAF and OAM/MP, and which kind of analytics the MP receive from the NWDAF, have not been defined yet.

SA5 defines in 3GPP TS 28.533 a new service related to analytics, namely the Management Data Analytics Service (MDAS), which uses as input data information from, for instance, PM and Fault Services (FS). The data considered in these services is about the NSIs, NSSIs, NFs, and network. There is no consideration about cross-slice, cross-service-instances, or information about types of applications that are used within a deployed network slice instance.

SUMMARY

In view of the above-mentioned challenges and disadvantages, embodiments of the invention aim to improve the conventional implementations for complex services. In particular, an objective is to provide an efficient implementation of multi-slice, multi-service-instance communication services, particularly to provide multi-slice, multi-service-instance assurance for SLA and QoS requirement fulfilment. To this end, embodiments of the invention should provide devices and methods for managing services that are related to multiple network slices. A network slice can be defined as a network slice instance (NSI) defined by 3GPP SA5 and/or a network slice (S-NSSAI) defined by 3GPP SA2.

The objective is achieved by the embodiments of the invention as provided in the enclosed independent claims. Advantageous implementations of the embodiments are further defined in the dependent claims. In particular the present invention proposes embodiments for E2E assurance of 5G and/or beyond 5G services composed of multiple NSIs and/or multiple service instances.

A first aspect of the invention provides a device for managing a service, wherein the service is related to at least two network slices, the device being configured to obtain management data for the service from at least one of the slices, in particular one or more of the following: PM data for the service, FM data for the service, analytics data about the service; evaluate at least one assurance indicator of the service based on the management data; and generate further management data, in particular CM data for modification of the service and/or at least one of the slices, according to the evaluation result.

The device of the first aspect supports complex scenarios of services composed, in particular, of multi-slice instances and/or multi-service instances. Further, E2E assurance (SLA, QoS and/or QoE fulfilments) is enabled for these complex services. Accordingly, the device of the first aspect provides an efficient implementation of multi-slice, multi-service-instance communication services.

In an implementation form of the first aspect, the FM data includes an alert and/or fault event indication regarding to a SLA parameter, QoS parameter, QoE parameter, and/or key performance indicator (KPI) associated with the service; and/or the PM data includes a monitored parameter indicative of an actual performance of the service; and/or the analytics data comprises at least one of management plane operation, control plane operation, user experiences, 3rd party application data analytics.

The collected data allows efficient E2E for the complex services, and thus an efficient implementation of multi-slice, multi-service-instance communication services.

In a further implementation form of the first aspect, the assurance indicator of the service includes information about a SLA, QoS, QoE, and/or KPI fulfilment of the service.

Examples of such KPIs are as mentioned in 3GPP TS28.554 Release 15. These KPI categories are accessibility, integrity, utilization, retainability, availability, and mobility.

In a further implementation form of the first aspect, the service is related to at least two service instances, network slice instances, network slice subnet instances, and/or network functions.

Accordingly, a cross-service instance, cross-slice-instance, cross-slice-subnet-instance and/or cross-network-function management of the service can be performed.

In a further implementation form of the first aspect, the CM data indicates a modification and/or reconfiguration of at least one service instance, network slice instance, network slice subnet instance, and/or network function, particularly the modification and/or reconfiguration including: a scaling in/out of the resource utilization of a network slice instance and/or network slice subnet instance; a migration of a network slice instance, network slice subnet instance, and/or network function.

Modification of a service instance, NSI, NSSI or NF implies changing parameters and/or changing the configuration in order to meet the corresponding requirements. Example NSI modification are changes of NSI capacity, changes of NSI topology, and/or NSI reconfiguration. The NSI modification may trigger the NSSIs modifications whereas the NSSI modification may trigger the NFs modifications. Example NF modifications are at least PDU session modification and/or QoS flow modification. Reconfiguration implies changing the configuration.

In a further implementation form of the first aspect, the PM data and/or FM data are based on PM and/or FM performed across the multiple network slice instances, service instances, network slice subnet instances, and/or network functions.

In a further implementation form of the first aspect, the service is instantiated in a service layer, network slice layer, network slice subnet layer, and/or network function layer.

Thus, the assurance functionalities of the device can be provided a different, multiple or even each layer, for an improved E2E assurance for the service.

In a further implementation form of the first aspect, the service is related to at least two service instances, the device is configured to operate in the service layer, and the CM data indicates a modification and/or reconfiguration for enabling service assurance across the at least two service instances.

In a further implementation form of the first aspect, the service is related to at least two network slice instances, the device is configured to operate in the network slice layer, and the CM data indicates a modification and/or reconfiguration for enabling service assurance across the at least two network slice instances.

In a further implementation form of the first aspect, the service is related to at least one network slice instance composed of at least two network slice subnet instances, the device is configured to operate in a network slice subnet layer, and the CM data indicates a modification and/or reconfiguration for enabling service assurance across the at least two network slice subnet instances.

In a further implementation form of the first aspect, the service is related to at least one network slice subnet instance composed of at least two network functions, the device is configured to operate in a network function layer, and the CM data indicates a modification and/or reconfiguration for enabling service assurance across the at least two network functions.

In a further implementation form of the first aspect, the device is configured to provide the PM data and/or FM data of the service to an analytics function, and receive the analytics data from the analytics function, wherein the analytics data is about a management plane operation, control plane operation, user experience, and/or 3rd party application data analytics.

In a further implementation form of the first aspect, the device is configured to perform and/or support managed service related management data, PM and/or FM, in order to obtain the PM and/or FM data of at least one of the slices.

In a further implementation form of the first aspect, the device is configured to provide the management data and/or the further management data for further processing.

In a further implementation form of the first aspect, the device is configured to perform CM to support further management data.

In a further implementation form of the first aspect, the device supports a CSMF, a NSMF, a NSSMF and/or a Network Function Management Function (NFMF).

In a further implementation form of the first aspect, the device is configured to provide the management data, in particular PM, FM, analytics and/or CM, to a further service related to one of the at least two slices and/or obtain management data and/or CM for the further service.

In a further implementation form of the first aspect, the device is configured to indicate management data and/or CM of at least one of the slices with respect to the services supported by the at least one slice.

In a further implementation form of the first aspect, the device comprises: Interfaces with network data analytics functions to exchange the service related data, management data, and/or subscription request for data analytics; Interfaces with MP functions (CSMF, NSMF, NSSMF, NFMF) to exchange the service related information and/or to expose service related management data and/or further management data; Interfaces with further devices operated in the other service layers to exchange further management data.

A second aspect of the invention provides a method for managing a service, wherein the service is related to at least two network slices, the method comprising: obtaining management data for the service from at least one of the slices, in particular one or more of the following: PM data for the service, FM data for the service, analytics data about the service; evaluating at least one assurance indicator of the service based on the management data; and generating further management data, in particular CM, data for modification of the service and/or at least one of the slices, according to the evaluation result.

In an implementation form of the second aspect, the FM data includes an alert and/or fault event indication regarding to a SLA parameter, QoS parameter, QoE parameter, and/or key performance indicator (KPI) associated with the service; and/or the PM data includes a monitored parameter indicative of an actual performance of the service; and/or the analytics data comprises at least one of management plane operation, control plane operation, user experiences, 3rd party application data analytics.

In a further implementation form of the second aspect, the assurance indicator of the service includes information about a SLA, QoS, QoE, and/or KPI fulfilment of the service.

In a further implementation form of the second aspect, the service is related to at least two service instances, network slice instances, network slice subnet instances, and/or network functions.

In a further implementation form of the second aspect, the CM data indicates a modification and/or reconfiguration of at least one service instance, network slice instance, network slice subnet instance, and/or network function, particularly the modification and/or reconfiguration including: a scaling in/out of the resource utilization of a network slice instance and/or network slice subnet instance; a migration of a network slice instance, network slice subnet instance, and/or network function.

In a further implementation form of the second aspect, the PM data and/or FM data are based on PM and/or FM performed across the multiple network slice instances, service instances, network slice subnet instances, and/or network functions.

In a further implementation form of the second aspect, the service is instantiated in a service layer, network slice layer, network slice subnet layer, and/or network function layer.

In a further implementation form of the second aspect, the service is related to at least two service instances, the method operates in the service layer, and the CM data indicates a modification and/or reconfiguration for enabling service assurance across the at least two service instances.

In a further implementation form of the second aspect, the service is related to at least two network slice instances, the method operates in the network slice layer, and the CM data indicates a modification and/or reconfiguration for enabling service assurance across the at least two network slice instances.

In a further implementation form of the second aspect, the service is related to at least one network slice instance composed of at least two network slice subnet instances, the method operates in a network slice subnet layer, and the CM data indicates a modification and/or reconfiguration for enabling service assurance across the at least two network slice subnet instances.

In a further implementation form of the second aspect, the service is related to at least one network slice subnet instance composed of at least two network functions, the method operates in a network function layer, and the CM data indicates a modification and/or reconfiguration for enabling service assurance across the at least two network functions.

In a further implementation form of the second aspect, the method comprises providing the PM data and/or FM data of the service to an analytics function, and receiving the analytics data from the analytics function, wherein the analytics data is about a management plane operation, control plane operation, user experience, and/or 3rd party application data analytics.

In a further implementation form of the second aspect, the method comprises performing and/or supporting managed service related management data, PM and/or FM, in order to obtain the PM and/or FM data of at least one of the slices.

In a further implementation form of the second aspect, the method comprises providing the management data and/or the further management data for further processing.

In a further implementation form of the second aspect, the method comprises performing CM to support further management data.

In a further implementation form of the second aspect, the method comprises supporting a CSMF, a NSMF, a NSSMF and/or a Network Function Management Function (NFMF).

In a further implementation form of the second aspect, the method comprises providing the management data, in particular PM, FM, analytics and/or CM, to a further service related to one of the at least two slices and/or obtain management data and/or CM for the further service.

In a further implementation form of the second aspect, the method comprises indicating management data and/or CM of at least one of the slices with respect to the services supported by the at least one slice.

In a further implementation form of the second aspect, the method comprises: exchanging the service related data, management data, and/or subscription request for data analytics over interfaces with network data analytics functions; exchanging the service related information and/or exposing service related management data and/or further management data over interfaces with MP functions (CSMF, NSMF, NSSMF, NFMF); exchanging further management data over interfaces with further devices operated in the other service layers.

The method of the second aspect and its implementation forms achieve all advantages of the device of the first aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which.

DETAILED DESCRIPTION OF EMBODIMENTS

Figure 1:
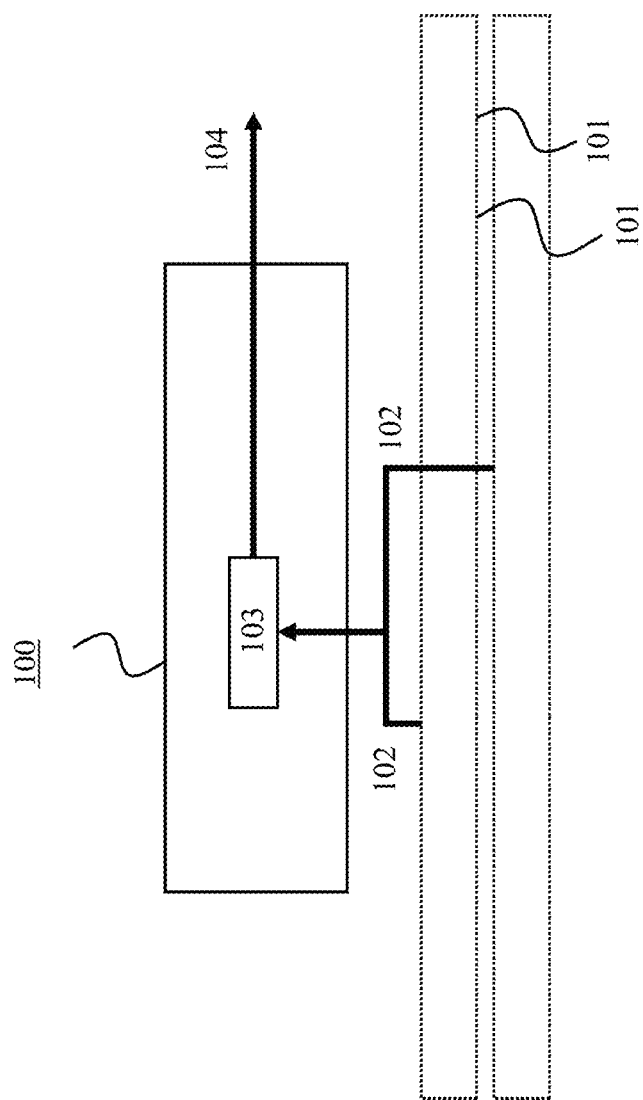
FIG. 1 shows a device according to an embodiment of the invention.

FIG. 1 shows a device according to a general embodiment of the invention. The device 100 is in particular configured to manage a service, wherein the service is related to at least two network slices 101. The device 100 may implement a novel function in the network, referred to as a cross-service assurance function.

The device 100 is particularly configured to obtain management data 102 for the service from at least one of the slices 101. The management data 102 may come only from one slice 101, but also from each of multiple slices 101. Based on this management data 102, the device 100 is configured to evaluate at least one assurance indicator 103 of the service. In particular, the assurance indicator 103 of the service may include information about a SLA, QoS, QoE and/or KPI fulfilment of the service, i.e. information whether the service can currently or in the future fulfil these requirements or not. Then, the device 100 is configured to generate further management data 104, according to the evaluation result, and may output this management data 104. This management data 104 may support the assurance of the service across the at least two network slices, or across multiple service instances.

Figure 2:
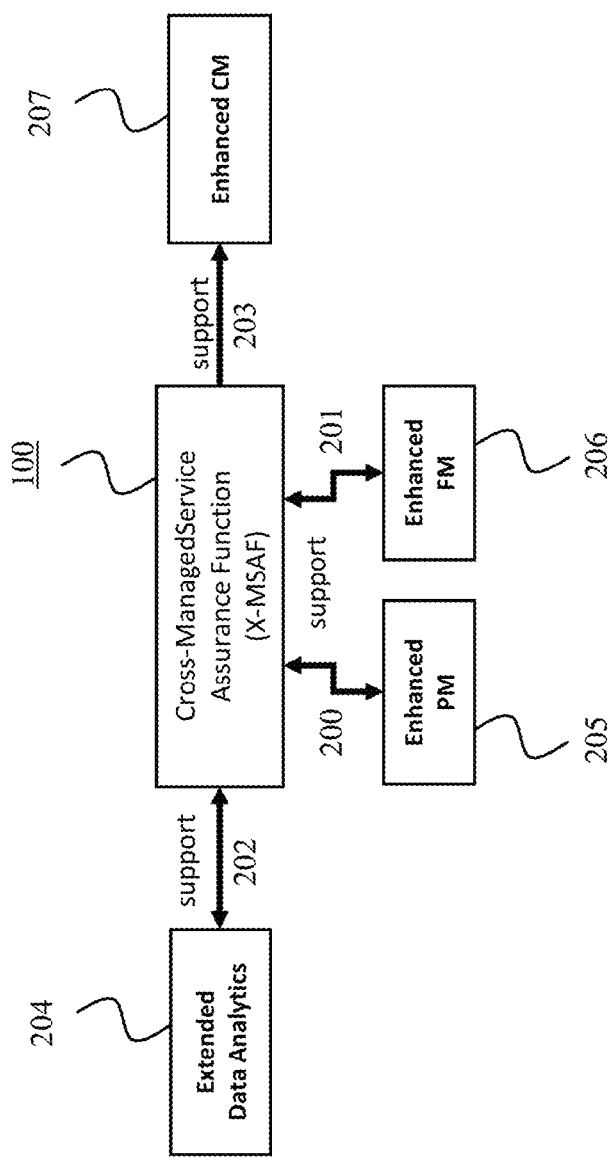
FIG. 2 shows a device according to an embodiment of the invention

FIG. 2 shows a device 100 according to an embodiment of the invention, which builds on the device 100 shown in FIG. 1. Same elements in FIG. 1 and FIG. 2 are labelled with the same reference signs and function likewise. In particular, in the device 100 of FIG. 2, the management data 104 includes particularly one or more of PM data 200 for the service, FM data 201 for the service, and analytics data 202 about the service. Further, the management data 104 is particularly CM data 203 for modification of the service and/or at least one of the slices 101, according to the evaluation result obtained when evaluating the at least one assurance indicator 103.

The device 100 of FIG. 2 may be referred to as a cross-Managed Service Assurance Function (X-MSAF) that supports E2E cross-slice, cross-service assurance functionalities for multi-slice, multi-service-instance communication services. The service may particularly include communication service(s), NSI(s), NSSI(s), and/or NF(s). Corresponding layers of the service may include a service layer, a network slice layer, a network slice subnet layer, and/or a network function layer.

Figure 9:
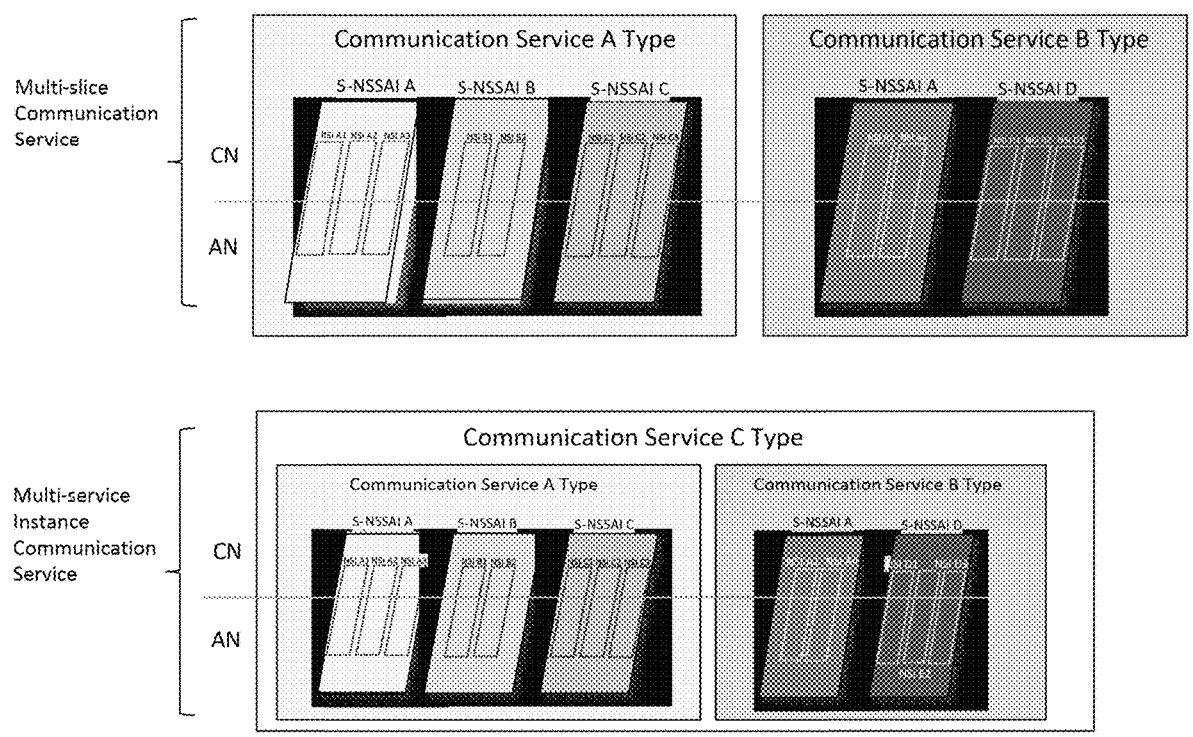
FIG. 9 shows an example of multi-slice, multi-service-instance communication services.

In particular, the x-MSAF 100 shown in FIG. 2 may be designed to provide the following features:

Perform an enhanced PM 205 support for the specific managed service (e.g., NSI-A1 of FIG. 9), which is shared by two or more communication service instances (e.g., communication service A and B of FIG. 9), by providing the corresponding PM data 200 (e.g., the corresponding throughput and resource utilization of the shared NSI-A1 for the corresponding communication service A and B).

Perform an enhanced FM 206 support for the specific managed service (e.g., NSI-A1 of FIG. 9), which is shared by two or more communication service instances (e.g., communication service A and B of FIG. 9) to provide the corresponding fault supervision alarms and/or fault events of managed service to the corresponding services (e.g., the fault supervision alarms are triggered if the corresponding throughput and resource utilization of the shared NSI-A1 are crossed the associated thresholds of the corresponding communication service A and B).

Send cross-managed-service related data (e.g., PM data) to a data analytics functions (NDAF) 204 to perform extended data analytics and the subscriptions/requests for analytics feedback 202 for the evaluation of assurance.

Evaluate the assurance of the managed service by utilizing:
   Enhanced PM data 200 and FM data 201.
   Data analytics feedback 202 by the NDAF 204.

The assurance procedure for a specific managed service performed by the device 100 of FIG. 2 may include at least the following steps:
   Monitoring and/or collecting the required PM data 200 from the corresponding functions or network elements, the required FM data 201 by listening the corresponding fault alarms, and the assurance related data from e.g. one or more other x-MSAFs.
   Collecting data analytics 202, which can assist in the evaluation process of the assurance indicator 103 by interacting with the NDAF 204 (e.g., NWDAF and Management Data Analytics Service (MDAS) as defined by 3GPP SA2/SA5).
   Evaluation of the collected management data 102 (i.e. PM data 200/FM data 201) and/or data analytics 202 of the specific managed service by comparing the service level objectives of the KPIs and/or QoS/QoE requirements of the specific managed service.
   Based on the evaluation results, if necessary, performing enhanced CM 207, which, in fact, may be the modification of the specific managed service (e.g., NSI-A1 from FIG. 9), which is shared by two or more communication service instances (e.g., the communication services A and B of FIG. 9) to provide the fulfilment of the corresponding services (e.g., the evaluation results shows the throughput and resource utilization of the NSI-A1 for the communication service A is violated with the corresponding SLA, therefore, the modification of NSI-A1 may be needed, example, the scaling of the resources for NSI-A1 is taken into account).

Figure 3:
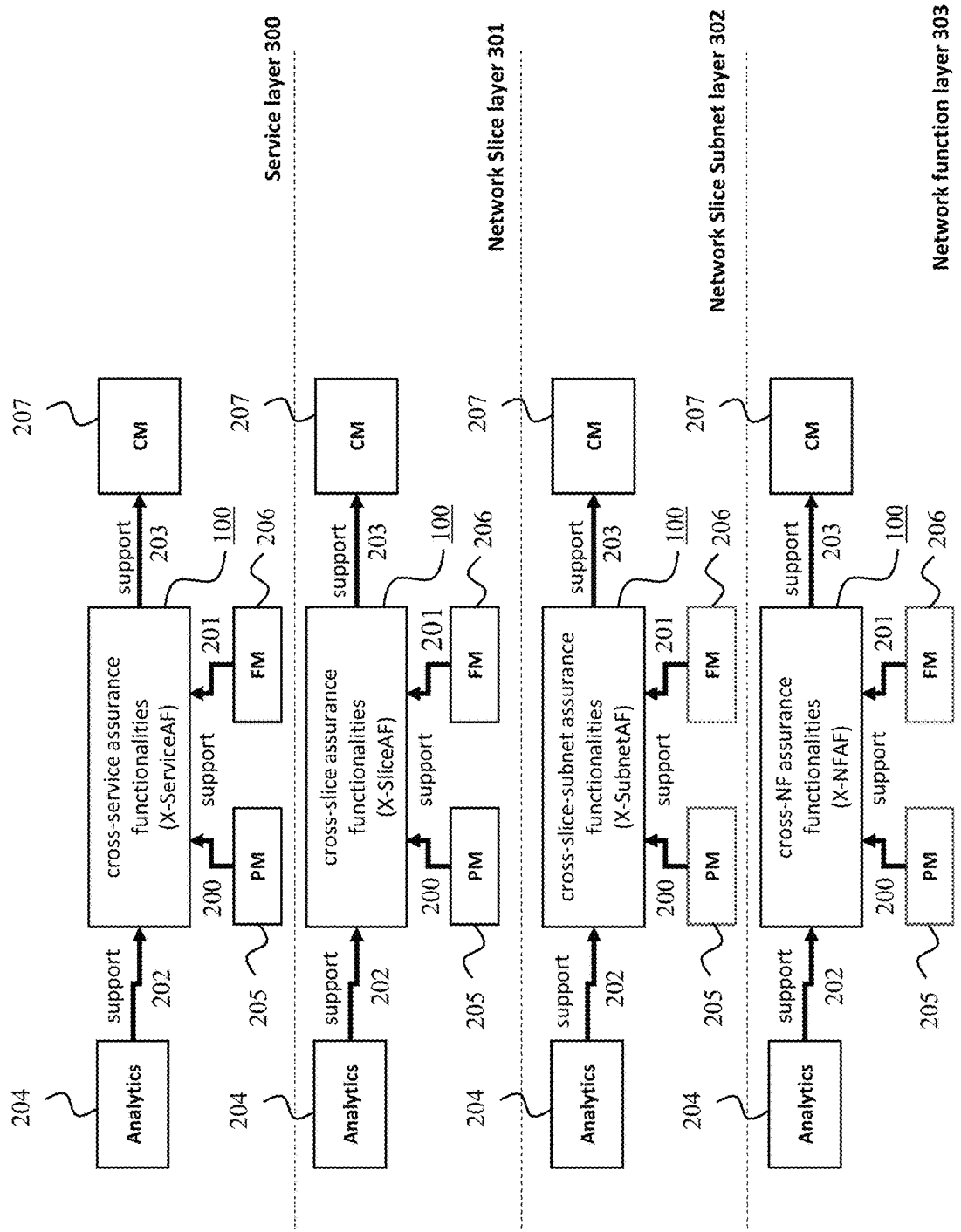
FIG. 3 shows devices according to an embodiment of the invention instantiated in different layers.

In addition to the above features of the general x-MSAF 100, layered-based specific x-MSAFs 100 (referred to as X-ServiceAF, X-SliceAF, X-SubnetAF, and X-NFAF) are now presented in FIG. 3 and briefly described below. Each x-MSAF 100 shown in FIG. 3 is a device 100 according to an embodiment of the invention, which builds on the device 100 shown in FIG. 1 and/or FIG. 2. The following functionalities may be provided:

Cross-service assurance functionalities (X-ServiceAF), wherein the device 100 is instantiated in a service layer 300. The X-ServiceAF is designed to manage the multi-service-instance related assurance management functionalities at the service layer 300. In particular, the X-ServiceAF may support the cross-service management data for the enhanced management data 102 (PM/FM/CM) at CSMF 400 (see FIG. 4), the required information about cross-service to the data analytics functions (e.g., NWDAF and/or MDAS). To perform the assurance loop, the functionalities of the X-ServiceAF may include:
   Collect the enhanced management data 102 (PM/FM) from CSMF 400.
   Collect the data analytics from the corresponding data analytics functions 204.
   Collect the cross-slice related assurance data from X-SliceAF (explained below).
   Evaluate the assurance of the service based on the collected data 102 and the KPIs of the service level objectives and QoS/QoE requirements of the composed services.
   If needed, modify the service layer related cross-service CM 207, and interact with the corresponding functions or network elements.

The purpose of the X-ServiceAF is:
   To support the assurance related functionalities for the services composed of multiple service instances at the service layer 300.
   To support the enhanced management data 102 (PM/FM/CM) at CSMF 400 for the specific multi-service instance communication service in a case where a communication service instance of the multi-service-instance communication service is shared with other communication services.
   To support the E2E service assurance for multi-service-instance service by interacting with the CSMF 400.
   To support the E2E service assurance for multi-service-instance service by interacting with the analytics functions 204.

Cross-slice assurance functionalities (X-SliceAF), wherein the device 100 is instantiated in a network slice layer 301. The X-SliceAF is designed to manage the multi-slice related assurance management functionalities at the slice layer 301. In particular, the X-SliceAF supports the cross-slice management data for the enhanced management data 102 (PM/FM/CM) at NSMF 401 (see FIG. 4), the required information about cross-slice to the data analytics functions 204 (e.g., NWDAF and/or MDAS). To perform the assurance loop, the functionalities of the X-SliceAF may include:
   Collect the enhanced management data 102 (PM/FM) from NSMF 401.
   Collect the data analytics 202 from the corresponding data analytics functions 204.
   Collect the cross-subnet related assurance data from X-SubnetAF (explained below).
   Evaluate the assurance of the service based on the collected data and the KPIs of the service level objectives and QoS/QoE requirements of the composed slice.
   If needed, modify the slice layer related cross-slice CM 207, and interact with the corresponding functions or network elements.

The purpose of the X-SliceAF is:
   To support the assurance related functionalities for the services composed of multiple service instances at the service layer 301.
   To support the enhanced management data 102 (PM/FM/CM) at CSMF 401 for the specific multi-service instance communication service in a case where a communication service instance of the multi-service-instance communication service is shared with other communication services.
   To support the E2E service assurance for multi-service-instance service by interacting with the CSMF 401.
   To support the E2E service assurance for multi-service-instance service by interacting with the analytics function 204.

Cross-subnet assurance functionalities (X-SubnetAF), wherein the device 100 is instantiated in a network slice subnet layer 302. The X-SubnetAF is designed to manage the multi-slice related assurance management functionalities at the slice subnet layer 302. In particular, the X-SubnetAF supports the cross-slice-subnet management data for the enhanced management data 102 (PM/FM/CM) at NSSMF 402 (see FIG. 4), the required information about cross-slice-subnet to the data analytics functions 204 (e.g., NWDAF and/or MDAS). To perform the assurance loop, the functionalities of the X-SubnetAF may include:

Collect the enhanced management data 102 (PM/FM) from NSSMF 402.

Collect the data analytics 202 from the corresponding data analytics functions 204.

Collect the cross-NF related assurance data from X-NFAF (explained below).

Evaluate the assurance of the network slice subnet based on the collected data and the service level objectives of the KPIs and QoS/QoE requirements of the composed slice subnet.

If needed, modify the slice subnet layer related cross-slice-subnet CM 207, and interact with the corresponding functions or network elements.

The purpose of the X-SubnetAF is:

To support the assurance related functionalities for the specific NSSIs which are composed in the specific slice instances of a specific service instance at the slice subnet layer 302.

To support the enhanced management data 102 (PM/FM/CM) of the NSSI for the specific NSI or NSSI correctly in a case where a NSSI of the specific NSI is shared with other NSIs or NSSIs.

To support the E2E service assurance for multi-slice service by interacting with the NSSMF 402.

To support the E2E service assurance for multi-slice service by interacting with the analytics function 204.

Cross-NF assurance functionalities (X-NFAF), wherein the device 100 is instantiated in a network function layer 303. The X-NFAF is designed to manage the multi-slice related assurance management functionalities at the network function layer 303. In particular, the X-NFAF supports the cross-NF management data for the enhanced management data 102 (PM/FM/CM) at NFMF 403 (see FIG. 4), the required information about cross-NF to the data analytics functions 204 (e.g., NWDAF and/or MDAS). To perform the assurance loop, the functionalities of the X-NFAF may include:

Collect the enhanced management data 102 (PM/FM) from NFMF 403.

Collect the data analytics 202 from the corresponding data analytics functions 204.

Evaluate the assurance of the network functions based on the collected data and the service level objectives of the KPIs and QoS/QoE requirements of the corresponding network functions.

If needed, modify the network function layer related cross-NF CM 207, and interact with the corresponding functions or network elements The purpose of the X-NFAF is:

To support the assurance related functionalities for the specific NFs of the specific NSSIs of the specific NSIs of a specific service instance at the NF layer 303.

To support the enhanced management data 102 (PM/FM/CM) of the components of the specific NSSI (e.g., NFs or NS instances) for the specific NSI correctly in a case where the NSSI components (e.g., NFs, NS instances) of the specific NSI are shared with other NSSIs.

To support the E2E service assurance for multi-slice service by interacting with the NFMF 403.

To support the E2E service assurance for multi-slice service by interacting with the analytics function 204.

In addition, the following extended/enhanced functions may be provided for supporting the cross-slice, cross-service-instance assurance functionalities:

The management data 102 (PM/FM/CM) support at the management functions (e.g., 3GPP defined CSMF 400, NSMF 401, NSSMF 402, NFMF 403) may be extended to:

Receive the corresponding management data 102 (PM/FM/CM) about cross-service, and/or cross-slice, and/or cross-subnet, and/or cross-NF.

Generate enhanced management data 102 (PM/FM/CM) to support multi-service and/or multi-slice assurance.

Receive requests for the enhanced management data 102 (PM/FM/CM) to support multi-service and/or multi-slice assurance.

The analytics function 204 may be extended with the following functionalities to:

Receive information about cross-service, and/or cross-slice, and/or cross-subnet, and/or cross-NF.

Generate analytics feedback 202 to support multi-service and/or multi-slice assurance.

Receive subscriptions/requests for analytics 202 to support multi-service and/or multi-slice assurance.

Figure 4:
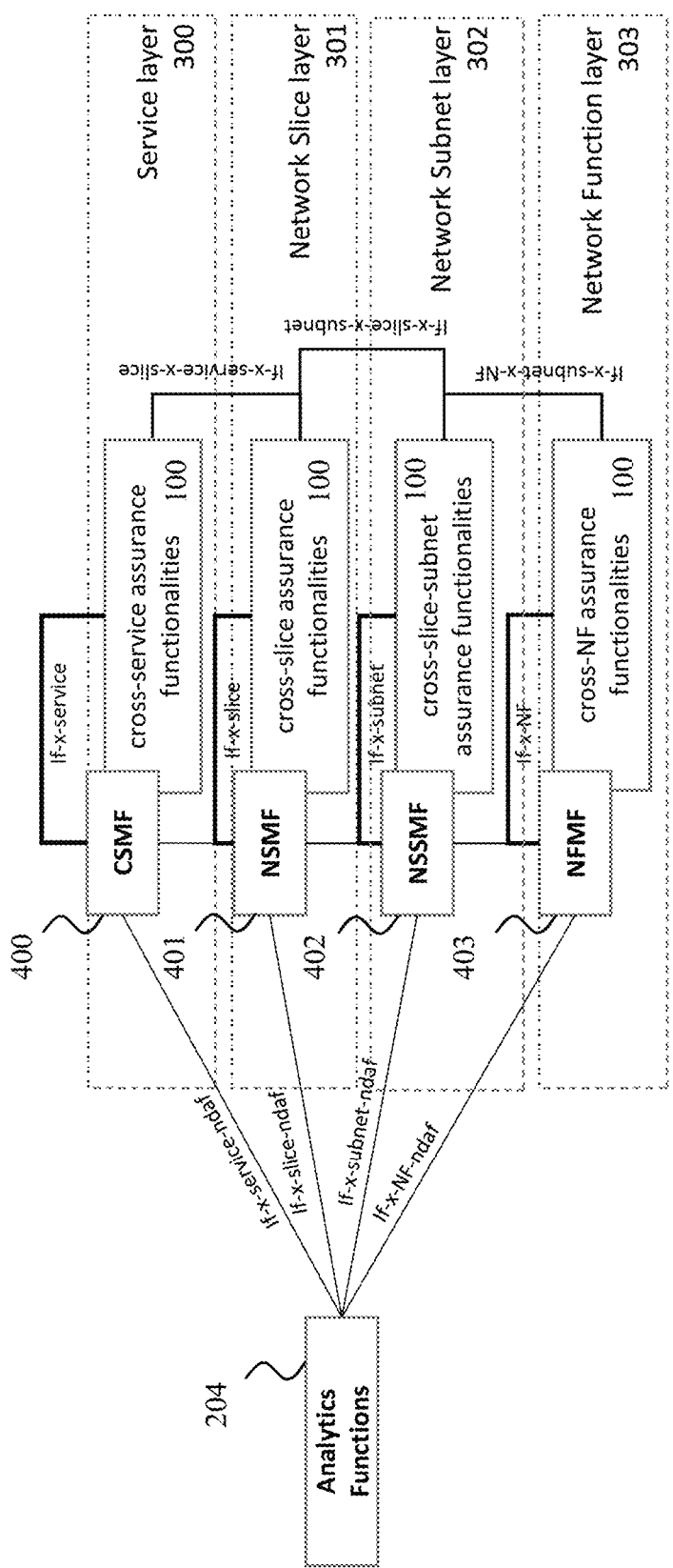
FIG. 4 shows an overview of interfaces of devices according to an embodiment of the invention instantiated in different layers.

To support the assurance of the multi-slice, multi-service-instance communication service, the cross-slice, cross-service assurance, interfaces may be defined at each layer (i.e. service layer 300, network slice layer 301, network slice subnet layer 302, and network function layer 303), as illustrated in FIG. 4. Thereby, as also shown in FIG. 4 the above-described assurance functionalities (X-ServiceAF, X-SliceAF, X-SubnetAF, and X-NFAF), i.e. the devices 100 according to embodiments of the invention, can be designed as enhanced CSMF 400, NSMF 401, NSSMF 402, and/or NFMF 403, or can be individual cross-slice, cross-service-instance assurance functions, in order to support multi-slice, multi-service-instance assurance. The following interfaces may be defined according to the three different categories (see FIG. 4):

Interfaces with MP functions (CSMF 400, NSMF 401, NSSMF 402, NFMF 403) as identified by 3GPP SA5, namely:

'If-x-service' interface:

This is the interface between X-ServiceAF and CSMF 400 including its management functions (e.g., PM/FM/CM).

This interface is used to exchange multi-service-instance related information, for example, the identifier mapping (multi-service-instance communication service ID with the associated communication service instances), the service level objectives of multi-service-instance communication service and its individual composed service instances, QoS/QoE requirements, and other requirements for each composed multi-service instance.

Multi-service-instance related cross-service management data are exposed to support the enhanced management data 102 (PM/FM/CM), which are supported by X-ServiceAF functionalities. An example of cross-service management data 102 includes the utilization of the corresponding virtualized resources (e.g., processor, memory, and disk) of the specific communication service instance, which is shared across multiple communication services. The cross-service management data 102 will be send to the CSMF 400 via this interface to provide the enhanced PM data 200. As a reference for PM data 200 enhancement, the KPIs as e.g. defined in TS 28.554 can be taken into account. A similar cross-service exposure for FM data 201 and CM data 203 for the corresponding services at the service layer 300 can be applied. For example, the X-ServiceAF provides the corresponding cross-service fault supervision of a shared communication service instance to the specific communication service at service layer 300. As a reference for FM data 201 enhancement, the alarm related services for fault supervision as defined in TS 28.545 can be taken into account.

Based on the cross-service management data 102 (PM/FM/CM) the enhanced management data 102 (PM/FM/CM) provided by CSMF 400 are exposed to support cross-service assurance functionalities.

'If-x-slice' interface:
This interface is between X-SliceAF and NSMF 401 including its management functions (e.g., PM/FM/CM).
Multi-slice related cross-slice management data are exposed to support the enhanced management data 102 (PM/FM/CM), which are supported by X-SliceAF functionalities. A similar example of the If-x-service interface can be applied for the network slice components.
Based on the cross-slice management data 102 (PM/FM/CM) the enhanced management data 102 (PM/FM/CM) provided by NSMF 401 are exposed to support cross-slice assurance functionalities.

'If-x-subnet' interface:
This interface is between X-SubnetAF and NSSMF 402 including its management functions (e.g., PM/FM/CM).
Multi-slice related cross-slice-subnet management data are exposed to support the enhanced management data 102 (PM/FM/CM) which are supported by X-SubnetAF functionalities. A similar example of If-x-service interface can be applied for the network slice subnet components.
Based on the cross-slice-subnet management data 102 (PM/FM/CM) the enhanced management data 102 (PM/FM/CM) provided by NSSMF 402 are exposed to support cross-slice-subnet assurance functionalities.

'If-x-NF' interface:
This interface is between X-NFAF and NFMF 403 including its management functions (e.g., PM/FM/CM).
Multi-slice related cross-NF management data are exposed to support the enhanced management data 102 (PM/FM/CM), which are supported by X-NFAF functionalities. A similar example of the If-x-service interface can be applied for the NFs.
Based on the cross-NF management data 102 (PM/FM/CM) the enhanced management data 102 (PM/FM/CM) provided by NFMF 402 are exposed to support cross-NF assurance functionalities.

Interfaces with network data analytics functions 204 as defined by 3GPP SA2/SA5, respectively NWDAF and/or MDAS:

'If-x-service-ndaf' interface:
This interface is between X-ServiceAF and the network data analytics functions 204.
The cross-service related data, for example, the service related identifier mapping are exposed.
The subscriptions/requests for service related data analytics 202 are sent.

'If-x-slice-ndaf' interface:
This interface is between X-SliceAF and the network data analytics functions 204.
The cross-slice related data, for example, the slice related identifier mapping are exposed.
The subscriptions/requests for slice related data analytics 202 are sent.

'If-x-subnet-ndaf' interface:
This interface is between X-SubnetAF and the network data analytics functions 204.
The cross-slice-subnet related data, for example, the slice subnet related identifier mapping are exposed.
The subscriptions/requests for slice subnet related data analytics 202 are sent.

'If-x-nf-ndaf' interface:
This interface is between X-NFAF and the network data analytics functions 204.
The cross-NF related data, for example, the NF related identifier mapping are exposed.
The subscriptions/requests for NF related data analytics 202 are sent.

Interfaces between the proposed assurance functions (X-MSAFs):

'If-x-service-x-slice' interface:
This interface is between X-ServiceAF and X-SliceAF for the management and assurance related data exposure of specific multi-slice instance.
Exposure request and reporting of the cross-slice assurance and management related data for the specific NSIs between X-SliceAF and X-SubnetAF.
The corresponding exposure request comes from the X-ServiceAF 'If-x-slice-x-subnet' interface:
This interface is between X-SliceAF and X-SubnetAF for the management and assurance related data exposure of specific NSSIs of the multi-slice service.
Exposure request and reporting of the cross-subnet assurance and management related data for the specific NSSIs between X-SliceAF and X-SubnetAF.
The corresponding exposure request comes from the X-SliceAF.

'If-x-subnet-x-nf' interface:
This interface is between X-SubnetAF and X-NFAF for the management and assurance related data exposure of specific NFs of the multi-slice service.
Exposure request and reporting of the cross-NF assurance and management related data for the specific NFs between X-SubnetAF and X-NFAF
The corresponding exposure request comes from the X-SubnetAF.

The main advantages achieved by the above devices 100 (X-MSAFs) with described with respect to FIG. 1 to FIG. 4 are:

5GS is enabled to support complex scenarios of services composed of multi-slice instances and/or multi-service instances where the constituents may or may not be shared with others network slices and/or services.

Support of the E2E assurance (SLA/QoS/QoE fulfillments) for the 5G and/or beyond 5G services composed of multiple slice and/or multiple service instances is enabled.

In the following, devices 100 according to specific embodiments of the invention are described with respect to FIG. 5, FIG. 6 and FIG. 7. These embodiments are based on the 5G management functions defined in 3GPP TS 28.53x series and on 5G network architecture defined in TS23.501 and TR 23.791. The embodiments for the cross-slice, cross-service assurance functionalities and interfaces defined are classified and mapped into three possible stages of a multi-slice and/or multi-service instances in 5G networks:

Service/NSI/NSSI creation.
Performance Management of NSI/NSSI.
Assurance for SLA fulfillment.
3GPP 5G networks considering NWDAF being extended with the proposed functionalities of the analytics function 204.

There are different possibilities to implement the X-MSAF functionalities defined above, i.e., the X-ServiceAF, X-SliceAF, X-SubnetAF, and X-NFAF. One possibility is to extend CSMF 400, NSMF 401, NSSMF 402, and/or NFMF 403, respectively, with the defined functionalities. Another possibility is to have the defined functionalities as individual functions that are associated with each respective level, i.e., X-ServiceAF with CSMF 400, X-SliceAF with NSMF 401, X-SubnetAF with NSSMF 402, and X-NFAF with NFMF 403.

In addition, there are different possibilities also for the extensions of the analytics function 204. One possibility is to extend the functionalities of the NWDAF network function existent in the control plane (CP) as defined in TS 23.501 and further studied in TR23.791, in order to enable NWDAF to generate the analytics data 202 to support multi-slice and multi-service instances assurance. Another possibility is to extend the functionalities of the MDAS service defined in TS25.533, in order to generate the analytics data 202 to support multi-slice and multi-service instances assurance.

The difference between these two possibilities is related to the type of feedback related to the multi-slice and/or multi-service instance assurance. When NWDAF is used, the cross-service, and/or cross-slice, and/or cross-subnet, and/or cross-NF feedback may contain specific information about groups of UEs, and/or perceived QoE, and/or applications within the deployed network slices. Meanwhile, when MDAS is used, the information is restricted to network slice instance, and/or network subnet instance, and/or NFs instances, and/or network. Although there are different possibilities for implementing the analytics function 204 to support multi-slice and multi-service instances assurance, there is no restriction to use only one of these possibilities at a time. This means that for the same system, both NWDAF and MDAS can be present and operating with the extensions proposed in this invention.

Figure 5:
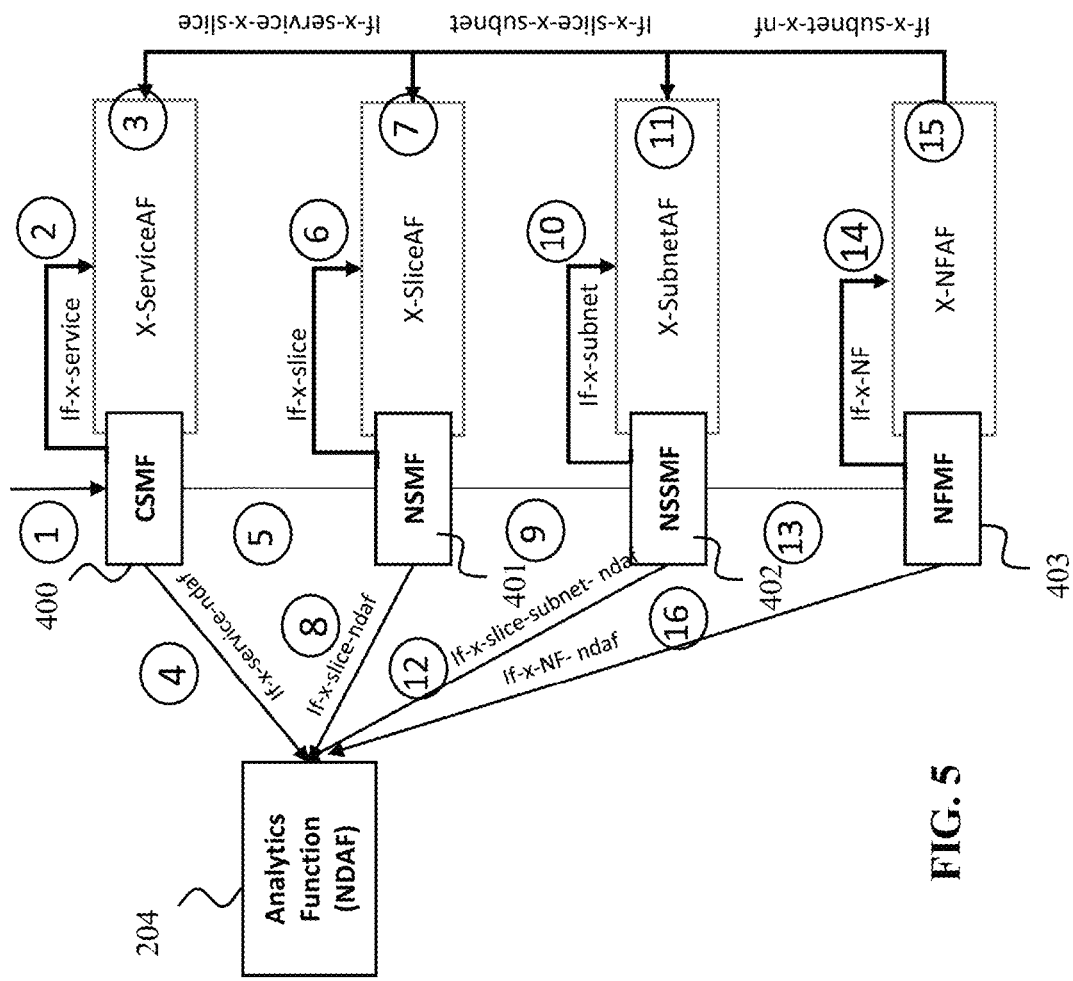
FIG. 5 shows cross-slice, cross-service assurance during services/NSI/NSSI creation supported by devices according to an embodiment of the invention.

FIG. 5 shows cross-slice, cross-service assurance during services/NSI/NSSI creation achieved by devices 100 according to embodiments of the invention. According to the 3GPP SA5 specifications, the CSMF 400 is responsible to create services, whereas the NSMF 401 and the NSSMF 402 are identified to create NSI and NSSI, respectively. The NFMF 403, for example, a NFV-MANO, is responsible to create virtualized network functions (VNFs). In the current 3GPP SA5 specifications, it is notably not clear how multi-slice, multi-service-instance service assurance can be managed.

The following steps briefly describe how the assurance functionalities (devices 100) and interfaces as defined above can be mapped with 3GPP SA2/SA5 defined functions for service/NSI/NSSI creation.

Step 1: CSMF 400 receives communication service information. CSMF 400 checks the service related information and decides to use multiple service instances. CSMF 400 sends multi-service instances related information to the X-ServiceAF. The related information includes but is not limited to the service level objectives of the KPIs and QoS/QoE requirements of each service instance. For each service instance with network slicing, CSMF 400 sends the request to NSMF 401 for allocating NSIs. After a successful creation of NSIs, the CSMF 400 will be notified with the network slice instance information of NSIs (e.g., the management identifier of NSIs) of each service instance. The CSMF 400 associates the multi-service instance communication service to its service instances and the corresponding network slice(S-NSSAI) and NSI(s).

Step 2: Upon receiving of the network slice instance information of NSIs of each service instance, CSMF 401 sends each service instance related information to X-ServiceAF with associated identifiers. For example, the identifier mappings of multi-service-instance communication service (multi-service-ID) to the service instances (service-IDs) to the corresponding network slices(S-NSSAIs) and network slice instances (NSI-IDs).

Step 3: X-ServiceAF performs necessary cross-service management functionalities for multi-service instances of the service. This includes but is not limited to creation of cross-service PM jobs, fault alarms tasks using the received identifier mapping from the step 2. If a service instance is shared by other communication services, the X-ServiceAF performs the corresponding management data 102 (PM/FM/CM) of the service instance for each specific communication service. The multi-service-instance related cross-service management data are exposed to the CSMF 400 to support the enhanced management data 102 (PM/FM/CM).

Step 4: In addition, the X-ServiceAF directly or indirectly (via CSMF 400) register to the analytics functions 204 to receive cross-service analytics feedback 202 about the deployed cross-service. During the registration/subscription the X-ServiceAF sends to the analytics functions 204 the identifiers of the cross-service that are the target of the analytics feedback 202.

Step 5: NSMF 401 receives network related information from CSMF 400 to create NSIs. NSMF 401 checks the network related information and may decide to use multi-slice instances. If multi-slice instances are used, NSMF 401 sends multi-slice instances related information to X-SliceAF. For each slice instance, NSMF 401 decides on the constituent NSSIs and the topology of the NSI to be created. NSMF 401 sends the request to NSSMF 402 for allocating NSSIs. After a successful creation of NSSIs, the NSMF 401 will be notified with the network slice subnet instance information of NSSIs (e.g., the management identifier of NSSIs) of each slice instance. The NSMF 401 associates the multi-slice instances to their slice subnet instances.

Step 6: Upon receiving of the network slice subnet instance information of NSSIs of each slice instance, NSMF 401 sends each slice instance related information to X-SliceAF with associated identifiers. For example, the identifier mappings of network slice instances (NSI-IDs) to the corresponding network slice subnet instances (NSSI-IDs).

Step 7: X-SliceAF performs necessary cross-slice management functionalities for multi-slice instances of the service instance. This includes but is not limited to creation of cross-slice PM jobs, fault alarms tasks using the received identifier mapping from the step 6. If a network slice instance is shared by other communication service instance, the X-SliceAF performs the corresponding management data 102 (PM/FM/CM) of the network slice instance for each specific communication service instance. The multi-slice-instance related cross-slice management data are exposed to the NSMF 401 and X-ServiceAF to support the enhanced management data 102 (PM/FM/CM).

Step 8: In addition, X-SliceAF directly or indirectly (via NSMF 401) register to the analytics functions 204 to receive cross-slice analytics feedback 202 about the deployed cross-slice. During the registration/subscription the X-SliceAF sends to the analytics functions 204 the identifiers of the cross-slice that are the target of the analytics feedback 202.

Step 9: NSSMF 402 receives network slice subnet related information from NSMF 401 to create NSSIs. NSSMF 402 checks the network slice subnet related information and decides to use multi slice subnet instances. In parallel, NSSMF 402 sends network slice subnet instances related information of the particular NSI to X-SliceAF. For each slice subnet instance, NSSMF 402 sends the request to NFMF (e.g., NFVO) for allocating NFs. After a successful provisioning of NFs, the NSSMF 402 will be notified with the network functions information (e.g., the identifiers) of each constituents NSSI. The NSSMF 402 associates the network slice subnet instances to their constituents.

Step 10: Upon receiving of the NFs information of NSSIs of each slice instance, NSSMF 402 sends NF related information to X-SubnetAF with associated identifiers. For example, the identifier mappings of network slice subnet instances (NSSI-IDs) to the corresponding NSSI constituents (e.g., NF-IDs).

Step 11: X-SubnetAF performs necessary cross-slice subnet management functionalities for multi-slice instances of the service. This includes but is not limited to creation of cross-subnet PM jobs, fault alarm tasks using the received identifier mapping from the step 10. If a network slice subnet instance is shared by other network slice instance, the X-SubnetAF performs the corresponding management data 102 (PM/FM/CM) of the network slice subnet instance for each specific network slice instance. The network slice subnet related cross-slice-subnet management data are exposed to the NSSMF 402 and X-SliceAF to support the enhanced management data 102 (PM/FM/CM).

Step 12: In addition, X-SubnetAF directly or indirectly (via NSSMF 402) register to the analytics functions 204 to receive cross-subnet analytics feedback 202 about the deployed cross-subnets. During the registration/subscription the X-SubnetAF sends to the analytics functions 204 the identifiers of the cross-subnet that are the target of the analytics feedback 202.

Step 13: NFMF 403 (e.g., NFVO) receives NF related information from NSSMF 402. The NFMF 403 (e.g., NFVO) performs NS instantiation.

Step 14: The NFMF 403 sends the (virtualized) network functions related information of the particular NSSI to X-NFAF. For example, the identifiers mappings of network functions (NF-IDs) to the corresponding NSSI (e.g., NSSI-IDs).

Step 15: The X-NFAF performs necessary cross-NF management functionalities for multi-slice instances of the service. This include but are not limited to creation of cross-NF PM job, fault alarm task using the received identifier mapping from the step 14. If a network function is shared by other network slice subnet instance, the X-NFAF performs the corresponding management data 102 (PM/FM/CM) of the network function for each specific network slice subnet instance. The network function related cross-NF management data are exposed to the NFMF 403 and X-SubnetAF to support the enhanced management data 102 (PM/FM/CM).

Step 16: In addition, X-NFAF directly or indirectly (via NFMF 403) register to the analytics functions 204 to receive cross-NF analytics feedback 202 about the deployed cross-NFs. During the registration/subscription the X-NFAF sends to the analytics functions 204 the identifiers of the cross-NF that are the target of the analytics feedback 202.

Figure 6:
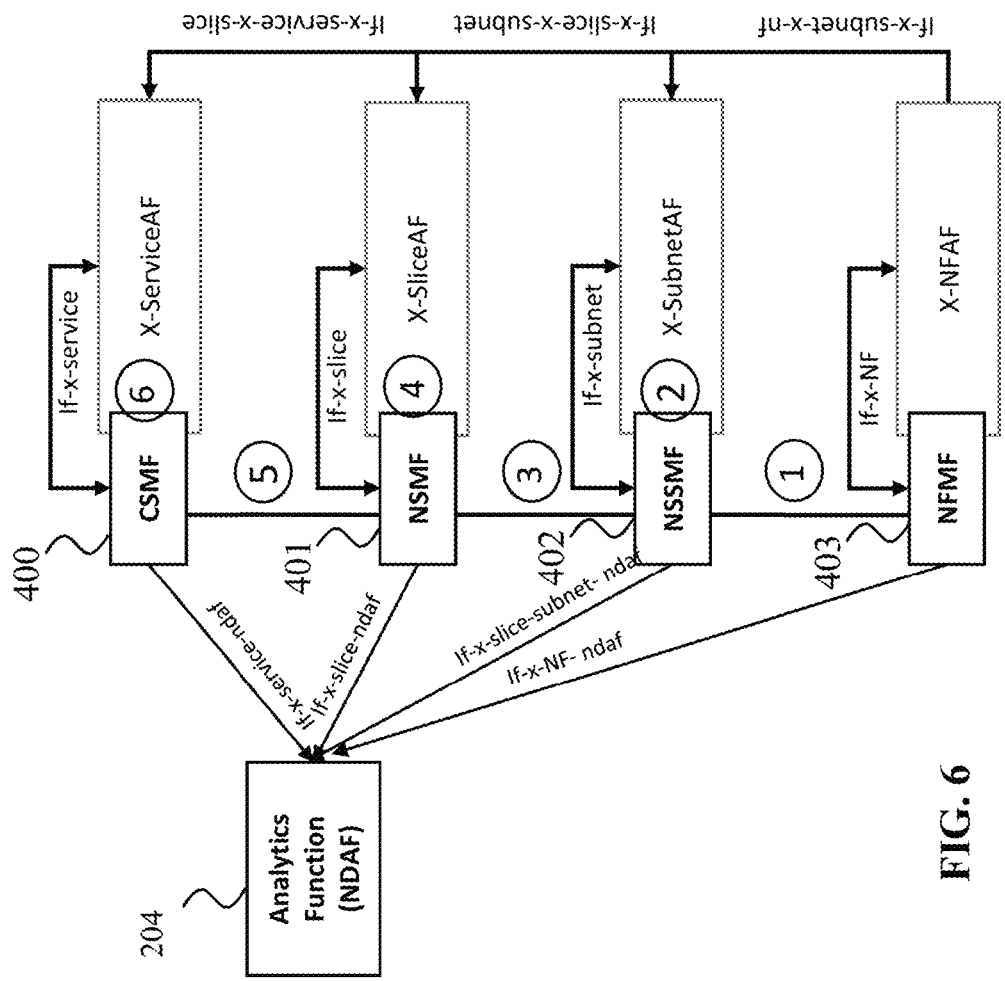
FIG. 6 shows cross-slice, cross-service assurance for PM supported by devices according to an embodiment of the invention.

FIG. 6 shows cross-slice, cross-service assurance for PM of service/NSI/NSSI achieved by devices 100 according to embodiments of the invention. The following briefly describes how the assurance functionalities and interfaces defined above can be mapped with 3GPP SA2/SA5 defined functions to support enhanced performance management according to FIG. 6.

Step 1: For each component of the NSSI, the 3GPP management system fetches performance measurement data on the components of the NSSI. If a component of the NSSI is shared with other NSSIs, the performance of the NSSI should be taken into the consideration of shared parts. The 3GPP management system(example, supporting by X-NFAF) should fetch the corresponding performance data of the component of the NSSI for the specific NSI correctly.

Step 2: The 3GPP management system generates the NSSI-level performance measurement data and sends the NSSI-level performance measurement data to the NOP. If a NSSI is shared with other communication service, the performance of the NSSI should be taken into the consideration of shared parts. The 3GPP management system (example, supporting by X-SubnetAF) should generate the corresponding performance data of the NSSI for the specific NSI correctly and sends the NSSI-level the corresponding performance measurement data to the corresponding performance measurement data consumers (e.g., NOP, NSMF, X-SliceAF).

Step 3: For each NSSI associated with the NSI the 3GPP management system fetches NSSI-level performance measurement data. If a NSSI is shared with other NSIs or NSSIs, the performance of the NSSI should be taken into the consideration of shared parts. The 3GPP management system (e.g., supporting by X-SliceAF) should fetch the corresponding performance data of the NSSI for the specific NSI or NSSI correctly.

Step 4: The 3GPP management system generates the NSI-level performance measurement data and sends the NSI-level performance measurement data to the NOP. If a NSI is shared with other communication service, the performance of the NSI should be taken into the consideration of shared parts. The 3GPP management system (example, supporting by X-ServiceAF) should fetch the corresponding performance data of the NSI for the specific communication service correctly and sends the NSI-level the corresponding performance measurement data to the corresponding performance measurement data consumers (e.g., NOP, CSMF 400, X-ServiceAF).

Step 5: For each NSI associated with the communication service instance the 3GPP management system fetches NSI-level performance measurement data. If a NSI is shared with other NSIs or communication service instances, the performance of the NSI should be taken into the consideration of shared parts. The 3GPP management system (e.g., X-ServiceAF) should fetch the corresponding performance data of the NSSI for the specific NSI or NSSI correctly.

Step 6: The 3GPP management system generates the NSI-level performance measurement data and sends the NSI-level performance measurement data to the NOP. If a NSI is shared with other communication service, the performance of the NSI should be taken into the consideration of shared parts. The 3GPP management system (example, supporting by X-ServiceAF) should fetch the corresponding performance data of the communication service instance for the specific communication service correctly and sends the service instance-level the corresponding performance measurement data to the corresponding performance measurement data consumers (e.g., NOP, CSMF 400).

Figure 7:
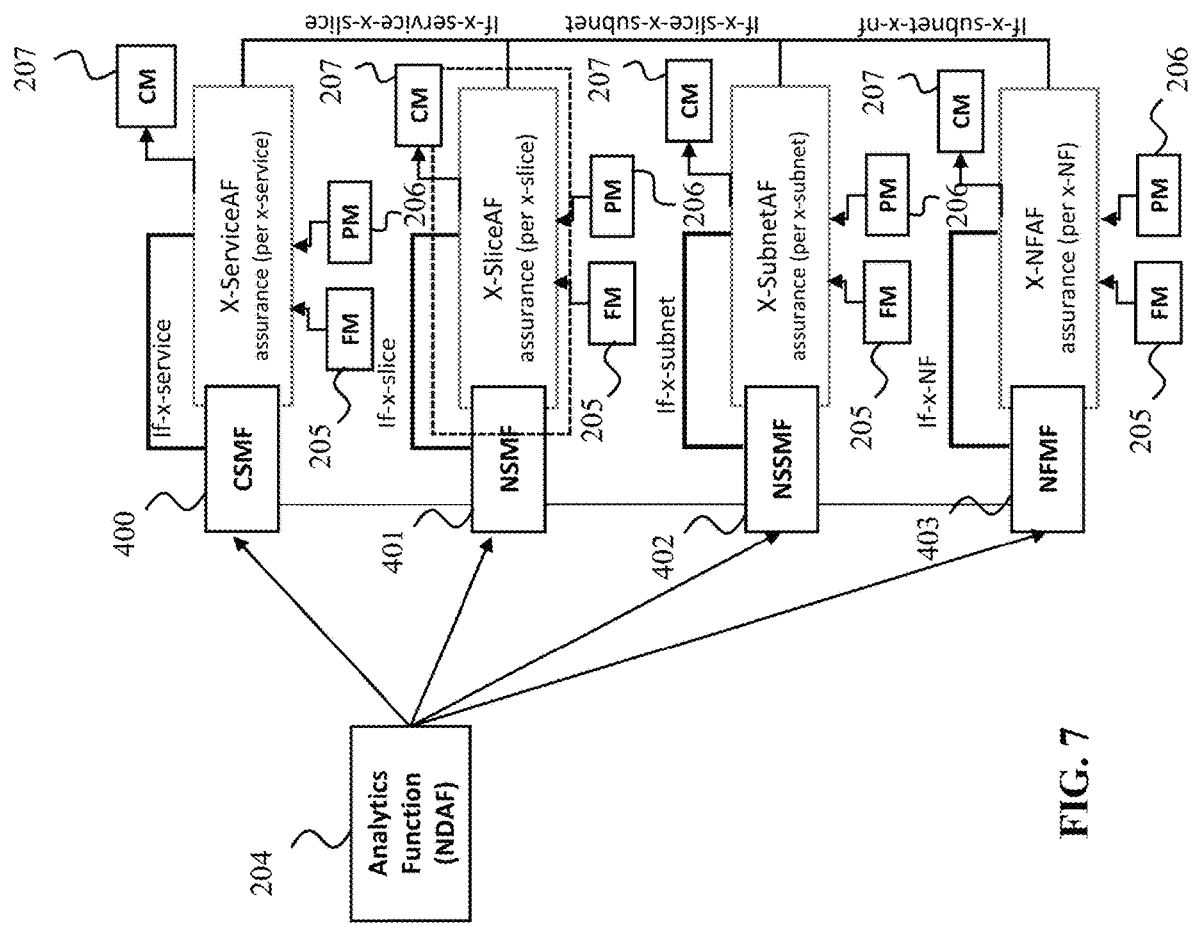
FIG. 7 shows cross-slice assurance management supported by devices according to an embodiment of the invention.

FIG. 7 shows cross-slice assurance management for SLA fulfilment achieved by devices 100 according to embodiments of the invention. At each layer 300-303 (i.e., NF/Subnet/Slice/Service), the assurance of the corresponding managed entities can be evaluated for SLA and QoS/QoE fulfillments. An example of the assurance management procedures at X-SliceAF is discussed below. As a precondition, the KPIs of the QoS/QoE requirements of each composed slice are available at the X-SliceAF. For instance, NSMF 401 is provided the network slice related requirements during NSIs creation. The following steps related to the assurance functionalities and interfaces defined above.

Step 1: The X-SliceAF may receive a request to evaluate cross-slice assurance by other management functions (e.g., NSMF 401) or may initiate itself based on the policy defined on the cross-slices' management data 102 (PM/FM) requirements or due to a notification received from the analytics function 204 with a cross-slice analytics feedback 202 (which can be a reusable or an specific feedback type.)

Step 2: Based on the condition by step 1, the X-SliceAF starts the assurance management for the composed slices. The procedure includes but is not limited to the evaluation of QoS/QoE requirements of each composed slice with the actual measurements supported by the cross-slices' performance data 102 (PM/FM) and/or the information related to the cross-slice analytics feedback either received from the analytics function 204 (either via request/response or subscribe/notify modes).

Step 3: If there is no violations, go to step 5 with a result of no increase violation counts. Otherwise, the violation is counted and the X-SliceAF performs the cross-slices' configuration management for the corresponding composed slice(s) according to the configuration policy. The CM includes but is not limited to the followings: scaling in-out of specific NSIs, NSI migration, triggering isolation of NSIs (i.e., eliminating shared resources of an NSI by deploying dedicated network slice instances resources such as non-shared subnets) etc. The X-SliceAF interacts the corresponding management functions involved in the configuration process. For example, the specific NSSIs of one of the composed NSIs may need to migrate, hence, the X-SliceAF sends a notification request to the related functions (e.g., NSMF 401, X-SubnetAF) to performs the required actions at the corresponding layers, subnet layer 302 and NF layer 303, in this case.

Step 4: After the configuration is completed at the lower layers (e.g., subnet and NF layers 302, 303), the X-SliceAF may receive the information related to the configuration of a specific NSIs. The X-SliceAF may update the changes if necessary. Then the evaluation of the QoS/QoE requirements of the unfulfilled slice(s) begins and records.

Step 5: After completing of the evaluation of multi-slice assurance, the X-SliceAF sends the evaluation result to the corresponding functions (e.g., NSMF and/or X-ServiceAF).

Another specific embodiment for 3GPP 5G networks considers a NWDAF being extended with the proposed functionalities of the analytics function 204, and is now described. In particular, one example of a possible cross-slice analytics feedback 202, which the NWDAF can recommend to the X-SliceAF, is described. The NWDAF specification may to this end be adapted with the following features:

The possible values for the object target and currently mapped to an Event Report Target field of an analytics subscription/request need to be extended to support cross-service, cross-slice, cross-subnet, and cross-NF parameters to be analyzed by the NWDAF.

The subscription/request for a cross-slice (but also applicable for the other levels) should be extended in order for the subscriber (in this case X-SliceAF) to indicate different preferences, e.g., weighting factors, for the computation of each slice related to the cross-slice feedback, to be considered by the NWDAF on the generation of the cross-slice analytics feedback 202.

NWDAF can provide as feedback to X-SliceAF the indication of the user satisfaction for the multi-slice communication service, using as basis for the analytics generation the correlation of the UE ID over the cross-slices, the load measurements of each individual slice composing the cross slice, and the performance information related to application IDs used by such users in those slices. The different preferences, i.e., weighting factors, for each slice of the requested cross-slice analytics feedback are used in the NWDAF computation.

NWDAF can also provide a recommendation, i.e., a specific feedback, for the X-SliceAF, indicating the user satisfaction for the multi-slice, and including the ranked list of user satisfaction per slice of the cross-slice feedback. This kind of information can help the X-SliceAF to determine the changes (if required) in which slice of the multi-slice communication service.

Figure 8:
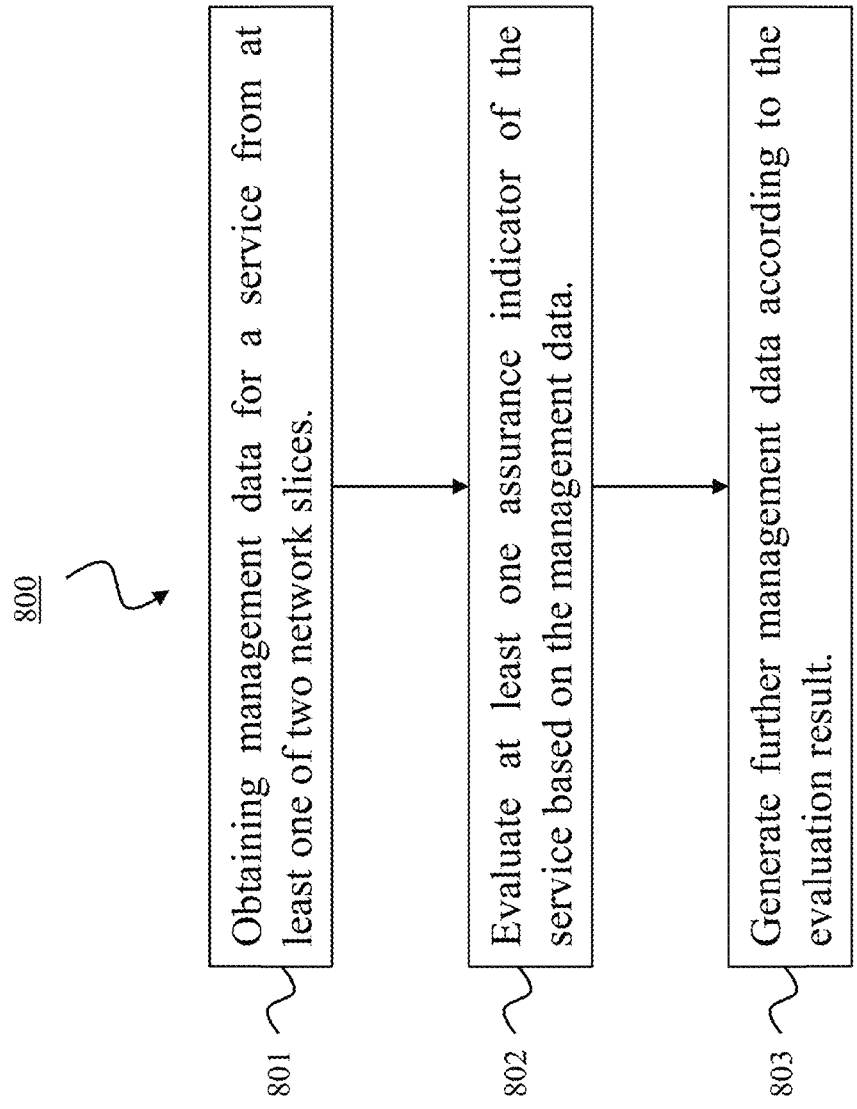
FIG. 8 shows a method according to an embodiment of the invention supported by devices according to an embodiment of the invention.

FIG. 8 shows a method 800 according to an embodiment of the invention. The method 800 is in particular for managing a service, wherein the service is related to at least two network slices 101. The method 800 may be carried out by the device 100 shown in FIG. 1 or 2. The method 800 comprises a step 801 of obtaining management data 102 for the service from at least one of the slices 101. In particular, one or more of the following are obtained: PM data 200 for the service, FM, data 201 for the service, analytics data 202 about the service. Further, the method 800 comprises a step 802 of evaluating at least one assurance indicator of the service based on the management data. Further, the method 800 comprises a step 803 of generating further management data 104, in particular CM data 203 for modification off the service and/or at least one of the slices 101, according to the evaluation result.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A device comprising:
at least one processor; and
a memory coupled to the at least one processor and storing programming instructions for execution by the at least one processor to:
obtain management data for a service from at least one of a network slices, wherein the management data comprises one or more of performance management (PM) data for the service or fault management (FM) data for the service, wherein the management data further comprises analytics data of the service, and wherein the analytics data comprises at least one of management plane operation, control plane operation, user experiences, or third-party application data analytics;
evaluate at least one assurance indicator of the service based on the management data to generate an evaluation result, wherein the at least one assurance indicator comprises information about fulfilment of a service level agreement; and
generate, based on the evaluation result, configuration management (CM) data for modification of one or more of the service or at least one of the network slices, wherein the CM data indicates a scaling in or out of a resource utilization of at least one of a network slice instance or a network slice subnet instance.

2. The device according to claim 1, wherein the FM data comprises at least one of an alert or fault event indication corresponding to a service level agreement parameter, a quality of service parameter, a quality of experience parameter, or a key performance indicator, wherein the PM data comprises a monitored parameter indicative of an actual performance of the service.

3. The device according to claim 1, wherein the at least one assurance indicator further comprises information associated with one or more of a quality of service, a quality of experience, or a key performance indicator of the service.

4. The device according to claim 1, wherein
the service is associated with at least two service instances, network slice instances, network slice subnet instances, and/or network functions.

5. The device according to claim 1, wherein the service is instantiated in at least one of a service layer, a network slice layer, a network slice subnet layer, or a network function layer.

6. The device according to claim 5, wherein the service is related to at least two service instances, wherein the device is configured to operate in the service layer, and wherein the CM data indicates a modification or reconfiguration for enabling service assurance between the at least two service instances.

7. The device according to claim 5, wherein the service is related to at least two network slice instances, wherein the device is configured to operate in the network slice layer, and wherein the CM data indicates a modification or reconfiguration for enabling service assurance between the at least two network slice instances.

8. The device according to claim 5, wherein
the service is related to at least one network slice instance that comprises at least two network slice subnet instances, wherein the device is configured to operate in a network slice subnet layer, and wherein the CM data indicates a modification or reconfiguration for enabling service assurance between the at least two network slice subnet instances.

9. The device according to claim 5, wherein the service is related to at least one network slice subnet instance that comprises at least two network functions, wherein the device is configured to operate in a network function layer, and wherein the CM data indicates a modification or reconfiguration for enabling service assurance between the at least two network functions.

10. The device according to claim 1, the programming instructions instruct the at least one processor to:
provide at least one of the PM data or the FM data of the service to an analytics function; and
receive the analytics data from the analytics function, wherein the analytics data is associated with at least one of a management plane operation, control plane operation, user experience, or third-party application data analytics.

11. The device according to claim 1, the programming instructions instruct the at least one processor to:
perform or support at least one of service related management data, PM or FM, to obtain at least one of the PM data or the FM data of at least one of the network slices.

12. The device according to claim 1, the programming instructions instruct the at least one processor to provide at least one of the management data or the CM data for additional processing.

13. The device according to claim 1, the programming instructions instruct the at least one processor to:
perform CM to support the CM data.

14. The device according to claim 1, wherein the device supports at least one of a communication service management function (CSMF), a network slice management function (NSMF), a network slice subnet management function (NSSMF), or a network function management function (NFMF).

15. The device according to claim 1, the programming instructions instruct the at least one processor to provide at least one of the PM data, the FM data, the analytics data or the CM data, to an additional service related to one of the network slices, or obtain at least one of the management data or the CM data for the additional service.

16. The device according to claim 1, the programming instructions instruct the at least one processor to indicate at least one of the management data or the CM data of at least one of the network slices corresponding to services supported by the at least one of the plurality of slices.

17. The device according to claim 1, wherein the device comprises: one or more interfaces comprising network data analytics functions to exchange at least one of service related management data, the management data, or a subscription request for data analytics; one or more interfaces comprising at least one of a communication service management function (CSMF), a network slice management function (NSMF), a network slice subnet management function (NSSMF), or a network function management function (NFMF) to exchange information related to the service or to expose at least one of service related management data or the CM data; and one or more interfaces comprising devices operated in service layers for exchanging the CM data.

18. The device of claim 1, wherein the CM data further indicates a migration of at least one of a network slice instance, a network slice subnet instance, or a network function.

19. A method comprising:
- obtaining management data for a service from at least one of a network slices, wherein the management data comprises one or more of performance management (PM) data for the service or fault management (FM) data for the service, wherein the management data further comprises analytics data of the service, and wherein the analytics data comprises at least one of management plane operation, control plane operation, user experiences, or third-party application data analytics;
- evaluating at least one assurance indicator of the service based on the management data to generate an evaluation result, wherein the at least one assurance indicator comprises information about fulfilment of a service level agreement; and
- generating, based on the evaluation result, configuration management (CM) data for modification of one or more of the service or at least one of the network slices, wherein the CM data indicates a scaling in or out of a resource utilization of at least one of a network slice instance or a network slice subnet instance.

* * * * *